United States Patent [19]

Jones

[11] Patent Number: 5,179,147

[45] Date of Patent: * Jan. 12, 1993

[54] PROTECTIVE OVERCOAT COMPOSITIONS AND PHOTOGRAPHIC ELEMENTS CONTAINING SAME

[75] Inventor: Raymond T. Jones, Webster, N.Y.

[73] Assignee: Eastman Kodak Company, Rochester, N.Y.

[*] Notice: The portion of the term of this patent subsequent to Aug. 6, 2008 has been disclaimed.

[21] Appl. No.: 527,415

[22] Filed: May 23, 1990

[51] Int. Cl.$^5$ ................................................ C08K 5/54
[52] U.S. Cl. ................................... 524/261; 524/269; 524/366; 524/382; 524/398; 524/399
[58] Field of Search ............... 524/269, 261, 382, 366, 524/398, 399

[56] References Cited

U.S. PATENT DOCUMENTS

| | | | |
|---|---|---|---|
| 3,429,846 | 2/1989 | Bechtold et al. | 260/29.6 |
| 3,971,872 | 7/1976 | LeBoeuf | 428/412 |
| 4,028,300 | 6/1977 | Wake et al. | 524/100 |
| 4,049,868 | 9/1977 | Laurin | 428/412 |
| 5,037,871 | 8/1991 | Jones | 524/261 |

OTHER PUBLICATIONS

Dupont Product Information Bulletin "Zonyl Fluorosurfactants".

Primary Examiner—Joseph L. Schofer
Assistant Examiner—Jeffrey T. Smith
Attorney, Agent, or Firm—L. George Legg

[57] ABSTRACT

Protective overcoat compositions and photographic elements containing same comprise:
(a) a hydroxylated latex polymer;
(b) a hydrolyzed metal lower alkoxide; and,
(c) a fluoroalkyl polyether surface active agent.

The overcoat is transparent and flexible and provides protection against scratches and abrasion.

9 Claims, No Drawings

PROTECTIVE OVERCOAT COMPOSITIONS AND PHOTOGRAPHIC ELEMENTS CONTAINING SAME

FIELD OF THE INVENTION

This invention relates in general to photography and in particular to compositions for protective treatment of photographic elements. More specifically, this invention relates to photographic elements, such as still films, motion picture films, print films, microfiche, and the like, to which a coating composition has been applied to provide a protective overcoat layer as protection against scratching or abrasion.

BACKGROUND OF THE INVENTION

Photographic elements having protective overcoat layers are well known and a wide variety of different coating compositions have been proposed in the past for use as protective overcoats. Such overcoats serve a number of different purposes, such as to provide protection against fingerprints, abrasion and scratching, to protect against water spotting, to provide a particular surface texture such as a matte surface, to provide protection against blocking, and to act as anti-reflection layers which reduce glare. Layers of a temporary nature which are intended to be removed after they have served their purpose and layers which are permanently bonded to the photographic element have been described in the prior art. Protective overcoats can be applied to photographic elements by coating solutions or dispersions of film-forming agents in organic solvents such as are described, for example, in U.S. Pat. Nos. 2,259,009; 2,331,746; 2,706,686; 3,113,867; 3,190,197 and 3,145,670; by coating of aqueous film-forming compositions such as are described, for example, in U.S. Pat. Nos. 2,173,480; 2,798,004; 3,502,501 and 3,733,293; by coating of compositions containing discrete, transparent, solid particles of submicroscopic size as described in U.S. Pat. No. 2,536,764; by coating of plasticized polymer compositions as described in U.S. Pat. No. 3,443,946; by coating of polymerized perfluorinated olefins as described in U.S. Pat. No. 3,617,354; and by lamination of a protective layer as described, for example, in U.S. Pat. Nos. 3,397,980 and 3,697,277.

Many of the compositions used in the past to form protective overcoats on photographic elements have suffered from disadvantages which have greatly limited their usefulness. For example, it has been particularly difficult to formulate compositions which are fully satisfactory in providing abrasion and scratch resistance for photographic elements which are commonly subjected to severe conditions in handling and use, such as microfiche and motion picture films. Abrasion is particularly a problem because in all stages of preparation, use and development the film contacts other objects such as rollers and the like. For example, in motion picture film the film contacts various elements in the projection apparatus capable of abrading the film as a result of the contact. Protective overcoats for photographic elements must furthermore meet exacting requirements with respect to factors such as transparency and flexibility as well as abrasion resistance and scratch resistance, and must be very strongly bonded to the underlying material to avoid the possibility of delamination. Protective overcoats for photographic elements must also contain a sufficiently high percentage of solids to provide the desired protective characteristics but also have a sufficiently low viscosity to be coatable by machine methods such as roll coating.

While the coating compositions of the aforesaid patents represent an advance in the art of providing protective overcoats for photographic elements, still further improvement in such compositions would be highly desirable. It would be particularly advantageous to provide a coating composition which exhibits excellent adhesion toward processed photographic emulsion layers and toward all of the various types of support materials commonly used for photographic elements, for example, the cellulose acetate support materials and the polyester support materials. A problem can occur, however, in providing a coating composition capable of overcoating a surface with sufficient coverage of solids to provide the desired abrasion and scratch resistance while having a viscosity low enough to be coatable by various machines and processes. It would be particularly advantageous for the coating composition to be applicable to the element by a number of means, for example, by dip coating, roll coating, gravure coating, and the like.

SUMMARY OF THE INVENTION

The present invention is directed toward an improved coating composition that is especially useful for forming protective overcoats on photographic elements, which overcoats are transparent and flexible and exhibit improved abrasion and scratch resistance.

In particular, this invention provides a photographic element comprising (a) a support, (b) at least one image-forming layer on the support, and (c) a protective layer overlying the image-forming layer, the support side, or both sides. The protective layer comprises (a) a hydroxylated latex polymer cross-linked by a hydrolyzed metal lower alkoxide and (b) a fluoroalkyl polyether surface active agent.

Further, this invention includes within its scope the novel aqueous coating composition useful in preparing the aforesaid photographic element. Such coating composition comprises (a) a hydroxylated latex polymer, (b) a hydrolyzed metal lower alkoxide and (c) a fluoroalkyl polyether surface active agent.

DETAILED DESCRIPTION OF THE INVENTION

The elements of this invention are radiation sensitive photographic elements capable of recording an image upon exposure to radiation. The coating compositions described herein can be used to provide protective overcoats in many different types of photographic elements. For example, the photographic elements can be still films, motion picture films, paper prints, or microfiche. They can be black-and-white elements, color elements formed from a negative in a negative-positive process, or color elements formed directly by a reversal process. The photographic elements can comprise any of a wide variety of supports. Typical supports include cellulose nitrate film, cellulose ester films including cellulose triacetate film, poly(vinyl acetal) film, polystyrene film, poly(ethylene terephthalate) film, polycarbonate film, glass, metal, paper, polymer-coated paper, and the like. The image-forming layer or layers of the element typically comprise a radiation-sensitive agent, e.g. silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly(vinyl pyrrolidone), acrylamide polymers, and the like. A particularly common example of an image-forming layer is a gelatino/silver halide emulsion layer, and the compositions described herein provide excellent results in providing protective overcoats for such emulsion layers.

In a particular embodiment of the present invention, the protective overcoat is applied only to the image-bearing side of the photographic element. In a particularly preferred embodiment of the present invention, the protective overcoat is applied only to the support side of the element. In another embodiment of the present invention, the protective overcoat is applied to both sides of the element. It may be desirable when practicing embodiments of the invention that include coating the image-bearing side of the photographic element, to apply the protective coating after photographic processing of the exposed film to facilitate contact of the processing solutions with the emulsion layer or layers. It may also be desirable prior to applying the coating composition when practicing any embodiments of the invention to subject the underlying surface to corona discharge treatment in accordance with techniques known in the art. Also within the scope of the present invention, the protective overcoat may be applied to the support side of the photographic element after other coatings such as antistatic layers have been applied to the support side of the photographic element. Subbing layers suitable for promoting adhesion of the various layers may be employed in accordance with the common knowledge known in the art, especially that taught in U.S. Pat. Nos. 2,678,235; 2,627,088, 2,703,290; 2,794,742; 2,852,378 and 2,943,937.

The first essential ingredient in the coating compositions employed in the practice of this invention is a hydroxylated latex polymer which serves as a binder. The term "latex polymer" is used herein to include polymerized water-insoluble monomers. Any suitable hydroxylated latex polymer can be used in the composition of this invention, such as for example polyhydroxyethylacrylate, polyhydroxypropylacrylate, and polyhydroxypropylmethacrylate and the like. A preferred such hydroxylated latex polymer is polyhydroxyethylmethacrylate.

Particularly preferred are hydroxylated latexes formed from at least 40 mole percent of hydroxyl containing monomer.

Examples of particularly preferred hydroxylated latex polymers for the purpose of this invention include 2-hydroxyethylmethacrylate and its terpolymers with polymers such as n-butylacrylate, butylmethacrylate, 2-aminoethylacrylate hydrochloride, sodiumstyrenesulfonic acid, styrene, and 2-acrylamido-2-methylpropane sulfonic acid and its sodium salt, and the like.

The second essential ingredient of the coating composition is a hydrolyzed metal lower alkoxide which serves as a cross-linking agent. Methods of preparation of hydrolyzed metal lower alkoxides are known in the organic synthesis art. One such method, of preparing polysilicic acid, is described in U.S. Pat. No. 4,741,992. Any suitable metal lower alkoxide may be employed such as, for example, tetraethylorthosilicate, tetrabutylorthosilicate, tetraethylorthotitinate, tetrabutylorthotitinate, methyltriethoxysilane, methyltriethylorthotitinate, phenyltriethoxysilane, phenyltriethylorthotitinate, tetrapropoxysilane, and the like. In addition to the metal alkoxides set forth above, the alkoxides of metals such as germanium, aluminum, zirconium, boron, tin and the like may be employed. In addition, hydrolyzed mixtures of any of the above metal lower alkoxides may be employed as cross-linking agents in accordance with this invention. The cross-linking agent should be employed in an amount of from about 2 parts to about 4 parts to one part of latex polymer by weight depending upon the degree of cross-linking desired in the final coated layer. The cross-linking agent is preferably used in an amount of from about 3 parts to 1 part of latex polymer by weight.

The third essential ingredient of the coating composition is a fluoroalkyl polyether surface active agent. By "fluoroalkyl polyether surface active agent" is meant a surfactant containing totally fluorine substituted aliphatic moieties containing six to sixteen carbon atoms wherein the aliphatic moiety may contain mixtures of aliphatic chains varying from six to sixteen carbon atoms and a polyether moiety wherein the polyether chain varies from nine to fourteen ether linkages, and includes varying lengths of polyether linkages within the length of from nine to fourteen. The polyether moiety may include polyethylene or polypropylene segments. The fluoroalkyl polyether surface active agent may be a polymer containing both fluorinated hydrocarbon segments wherein all of the hydrogens have been replaced by fluorine and polyether segments wherein the alkyl chain of the polyether will be made up from either ethylene or propylene. Preferably, the fluoroalkyl polyether surface active agents are compounds or mixtures of compounds having the formula

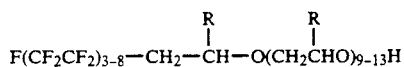

wherein R is hydrogen or methyl. The most preferred fluoroalkyl polyether surface active agent is one sold under the name Zonyl FSN by DuPont Company.

The fluoroalkyl surface active agent should be employed in an amount from about 0.01 to about 0.1 percent by weight based on the weight of the coating composition. A preferred use is in an amount of about 0.04 to about 0.06 percent by weight based on the weight of the coating composition.

Coating of the photographic element with the coating composition of this invention can be carried out in any convenient manner. For example, it can be carried out by dip coating, air-knife coating, roll coating, gravure coating, extrusion coating, bead coating, curtain coating, use of wire wound coating rods, and so forth. The compositions in accordance with this invention may be applied in any suitable coverage based on the dry weight of the composition and preferably in a coverage from about 5 (53.82) to about 200 (2152.78) milligrams per square foot (milligrams per square meter). Most preferably, the coverage in accordance with the invention should be from about 100 (1076.4) to about 150 (1614.6) milligrams per square foot (Milligrams per square meter). The viscosity of the coating composition must be sufficiently low to permit coating by processes such as roll coating but the solids content sufficiently high for sufficient abrasion and scratch resistance upon drying and curing. The optimum viscosity will depend on other factors as well, such as the type of element being treated, the optimum layer thickness, and the method of application of the composition. Typically, viscosity in the range from about 1 to about 100 centipoises are useful for this purpose, with the preferred range being from about 1 to about 20 centipoises, and the most preferred range being from about 5 to about 10 centipoises.

Subsequent to application in the desired location with respect to the structure of the radiation sensitive recording element, the coating composition layer is subjected to curing which transforms the aqueous coating composition into a permanent protective layer that is highly abrasion and scratch resistant. In the curing, temperatures of from about 25° C. to about 150° C. are typically employed. Preferably, a temperature from about 80° C. to about 140° C. and a curing time of about 1 to about 5 minutes are employed.

The coating compositions described herein particularly adhere strongly to both the image-bearing side and the support side of photographic elements and accordingly are particularly effective in providing protective overcoats on either or both of the image-bearing side and the support side. They are effective in providing adhesion to materials with which it is ordinarily difficult to achieve adhesion, such as the cellulose triacetate or poly(ethylene terephthalate) which are commonly used as support materials for photographic elements and the gelatino/silver halide emulsion layers or gelatin protective layers commonly employed on the image-bearing side of photographic elements. Drying and curing of the coating composition to a transparent, flexible, abrasion and scratch resistant polymeric layer can be carried out with no significant detrimental effect on the image-bearing layer(s), even with color elements in which the images are dye images.

The invention is further illustrated by the following examples of its practice.

EXAMPLE 1

An aqueous coating composition is prepared from 25 weight percent of a terpolymer of 50:5:45 mole percent n-butylacrylate/2-aminoethylacrylate hydrochloride/2-hydroxyethylmethacrylate and 75 weight percent of polysilicic acid, diluted to 1.5 weight percent of the terpolymer and 4.5 weight percent of polysilicic acid, and Zonyl FSN at 0.05 weight percent of the aqueous coating composition. Machine coatings are made at dry coverages of 75 (807.29) to 150 (1614.59) milligrams/square foot (milligrams/square meter) on a polyethylene terephthalate polyester support. The support coating is subjected to scratch and abrasion tests. The scratch resistance tests are carried out in accordance with ANSI Test Method PH1.37-1977 wherein larger single arm scratch values represent increased scratch resistance. The abrasion test is a Taber cycle abrasion resistance test in accordance with the A.S.T.M. D1044 test method of the American Society for Testing and Materials, Philadelphia, Pa., wherein lower values represent increased abrasion resistance. The paper clip friction tests were conducted in accordance with the procedures set forth in ANSI II 9.4-1988, wherein lower values represent good lubricity. Six runs are conducted at different coating coverages. The test results are shown in Table I below. The coatings show good abrasion resistance, particularly at coverages of 105 to 150 mg/sq ft, good scratch resistance at coverages of 90 to 150 mg/sq ft, and good lubricity at all tested values.

TABLE I

| Coverage mg/square foot (mg/square meter) | Paper Clip Friction | Single Arm Scratch | Taber Abrasion 100 Cycles |
|---|---|---|---|
| 75 (807.29) | 0.28 | 15 | 2.8 |
| 90 (968.75) | 0.30 | 30 | 3.4 |
| 105 (1130.21) | 0.30 | 50 | 1.8 |
| 120 (1291.67) | 0.30 | 50 | 0.9 |
| 135 (1453.13) | 0.30 | 50 | 1.8 |
| 150 (1614.59) | 0.30 | 50 | 1.3 |

EXAMPLE 2

The procedure of Example 1 is repeated except that the latex terpolymer is 25/35/40 mole percent n-butylacrylate/sodiumstyrenesulfonic acid/2-hydroxyethylmethacrylate and the hydrolyzed metal lower alkoxide is polysilicic acid, in a 25/75 mole percent mixture. The aqueous coating composition consists of weight percents of 1.5 percent latex terpolymer, 4.5 percent polysilicic acid, and 0.05 percent Zonyl FSN. Six runs are conducted and the test results are as in Table II below. The coatings show good abrasion resistance, scratch resistance, and lubricity at all six coating coverages tested.

TABLE II

| Coverage mg/square foot (mg/square meter) | Paper Clip Friction | Single Arm Scratch | Taber Abrasion 100 Cycles |
|---|---|---|---|
| 75 (807.29) | 0.32 | 45 | 1.1 |
| 90 (968.75) | 0.32 | 50 | 1.5 |
| 105 (1130.21) | 0.30 | 50 | 0.9 |
| 120 (1291.67) | 0.30 | 60 | 0.7 |
| 135 (1453.13) | 0.30 | 60 | 0.5 |
| 150 (1614.59) | 0.32 | 50 | 0.3 |

EXAMPLE 3

The procedure of Example 1 is repeated except that the latex terpolymer is 55/5/40 mole percent styrene/sodium salt of 2-acrylamido-2-methyl propane sulfonic acid/2-hydroxyethylmethacrylate and the hydrolyzed metal lower alkoxide is polysilicic acid, and the aqueous coating composition comprises by weight 1.5 percent latex terpolymer, 4.5 percent polysilicic acid, and 0.05 percent Zonyl FSN. Six runs are conducted and the test results shown in Table III below. The coatings show good abrasion resistance at coating coverages of 75 to 90 mg/ft$^2$, and good scratch resistance, and good lubricity at all tested coverages.

TABLE III

| Coverage mg/square foot (mg/square meter) | Paper Clip Friction | Single Arm Scratch | Taber Abrasion 100 Cycles |
|---|---|---|---|
| 75 (807.29) | 0.22 | 50 | 1.3 |
| 90 (968.75) | 0.20 | 50 | 1.7 |
| 105 (1130.21) | 0.24 | 60 | 7.9 |
| 120 (1291.67) | 0.24 | 50 | 9.6 |
| 135 (1453.13) | 0.24 | 35 | 5.7 |
| 150 (1614.59) | 0.22 | 30 | 5.4 |

EXAMPLE 4

The procedure of Example 1 is repeated except that the latex terpolymer is 55/5/40 mole percent butylmethacrylate/2-acrylamido-2-methyl-propane sulfonic acid/2-hydroxyethylmethacrylate and the hydrolyzed metal lower alkoxide is polysilicic acid. The aqueous coating composition comprises by weight 1.5 percent latex terpolymer, 4.5 percent polysilicic acid, and 0.05 percent Zonyl FSN. Six runs are conducted and the test results shown in Table IV below. The coatings show good abrasion resistance, particularly at coating coverages of 135 to 150 mg/ft$^2$, and good lubricity and good scratch resistance at all tested coverages.

TABLE IV

| Coverage mg/square foot (mg/square meter) | Paper Clip Friction | Single Arm Scratch | Taber Abrasion 100 Cycles |
|---|---|---|---|
| 75 (807.29) | 0.24 | 35 | 3.3 |
| 90 (968.75) | 0.22 | 30 | 4.0 |
| 105 (1130.21) | 0.24 | 35 | 3.3 |
| 120 (1291.67) | 0.24 | 35 | 3.0 |
| 135 (1453.13) | 0.24 | 35 | 1.3 |
| 150 (1614.59) | 0.24 | 30 | 1.6 |

The coating compositions described herein exhibit good abrasion resistance, scratch resistance, and lubricity. The coating compositions of this invention, furthermore, while containing sufficient percentage of solids to impart such protective characteristics are yet of sufficiently low viscosity to be coatable by machine methods such as roll coating. Coating compositions outside the scope of the present invention can have severe problems with coatability by machine at solids-containing levels sufficient to impart satisfactory abrasion and scratch resistance.

The invention has been described in detail with particular reference to preferred embodiments thereof, but it will be understood that variations and modifications can be affected within the spirit and scope of the invention.

What is claimed is:

1. An aqueous coating composition useful in forming cross-linked protective layers on photographic elements, such coating composition comprising:
   (a) a hydroxylated polymer formed from a water-insoluble, hydroxyl-containing monomer;
   (b) a hydrolyzed metal lower alkoxide; and
   (c) a fluoroalkyl polyether surface active agent.

2. The aqueous coating composition of claim 1, wherein said polymer contains at least 40 mole percent of hydroxyl containing monomer.

3. The aqueous coating composition of claim 1, wherein said hydrolyzed metal lower alkoxide is polysilicic acid.

4. The aqueous coating composition of claim 1, wherein said hydrolyzed metal lower alkoxide comprises by weight proportion from about 2 parts to about 4 parts to one part of said hydroxylated polymer.

5. The aqueous coating composition of claim 1, wherein said hydrolyzed metal lower alkoxide comprises by weight proportion about 3 parts to one part of said hydroxylated polymer.

6. The aqueous coating composition of claim 1, wherein said fluoroalkyl polyether surface active agent comprises a mixture of compounds having the general formula

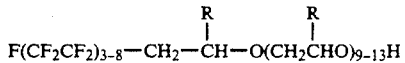

wherein R is hydrogen or methyl.

7. The aqueous coating composition of claim 1, wherein said fluroalkyl polyether surface agent is present in an amount of from about 0.01 to about 0.1 percent by weight of said aqueous coating composition.

8. The aqueous coating composition of claim 1, wherein said fluroalkyl polyether surface agent is present in an amount of from about 0.04 to about 0.06 percent by weight of said aqueous coating composition.

9. The aqueous coating composition of claim 6, wherein R is hydrogen.

* * * * *